US009990133B2

(12) United States Patent
Billington

(10) Patent No.: US 9,990,133 B2
(45) Date of Patent: Jun. 5, 2018

(54) STORAGE LIBRARY CLIENT INTERFACE SYSTEM AND METHOD

(75) Inventor: Robert L. Billington, Lyons, CO (US)

(73) Assignee: Oracle America, Inc., Redwood Shores, CA (US)

( * ) Notice: Subject to any disclaimer, the term of this patent is extended or adjusted under 35 U.S.C. 154(b) by 77 days.

(21) Appl. No.: 13/285,786

(22) Filed: Oct. 31, 2011

(65) Prior Publication Data
US 2012/0317258 A1 Dec. 13, 2012

Related U.S. Application Data

(63) Continuation of application No. 11/224,390, filed on Sep. 12, 2005.

(51) Int. Cl.
*G06F 3/06* (2006.01)

(52) U.S. Cl.
CPC .......... *G06F 3/0605* (2013.01); *G06F 3/0659* (2013.01); *G06F 3/0686* (2013.01)

(58) Field of Classification Search
None
See application file for complete search history.

(56) References Cited

U.S. PATENT DOCUMENTS

| | | | |
|---|---|---|---|
| 5,164,909 A | | 11/1992 | Leonhardt et al. |
| 5,416,914 A | * | 5/1995 | Korngiebel ............ G11B 15/68 369/34.01 |
| 6,425,035 B2 | | 7/2002 | Hoese et al. |
| 6,804,753 B1 | * | 10/2004 | Moody, II ............. G06F 3/0619 709/215 |
| 6,856,985 B1 | * | 2/2005 | Pierce ............... G06F 17/30286 |
| 7,051,147 B2 | | 5/2006 | Hoese et al. |
| 7,055,014 B1 | * | 5/2006 | Pawlowski ........... G06F 3/0605 707/E17.01 |
| 7,934,041 B2 | | 4/2011 | Hoese et al. |
| 2001/0034813 A1 | * | 10/2001 | Basham ................ G06F 3/0622 711/112 |
| 2002/0103857 A1 | * | 8/2002 | Soderberg ........... H04L 63/0428 709/203 |
| 2002/0169521 A1 | * | 11/2002 | Goodman ............. G06F 3/0622 700/245 |
| 2003/0093541 A1 | * | 5/2003 | Lolayekar ............... H04L 69/08 709/230 |
| 2003/0123274 A1 | * | 7/2003 | Camble ................ G06F 3/0601 365/100 |
| 2003/0126360 A1 | * | 7/2003 | Camble ................ G06F 3/0622 711/114 |
| 2003/0126395 A1 | * | 7/2003 | Camble ................ G06F 3/0626 711/173 |

(Continued)

*Primary Examiner* — Charles Rones
*Assistant Examiner* — Hewy H Li
(74) *Attorney, Agent, or Firm* — Invoke

(57) ABSTRACT

A system and method for managing data contained by a storage library includes at least one storage library and a library controller configured to generate signals that control operations of the storage library. The system further includes at least one client interface operable with the library controller and being adapted to receive requests from multiple client types and communicate those requests to the library controller. Additionally, the library controller generates signals for the storage library and the storage library performs operations that correspond to the requests from the multiple client types.

13 Claims, 2 Drawing Sheets

(56) References Cited

U.S. PATENT DOCUMENTS

2003/0126396 A1* 7/2003 Camble ................ G06F 3/0601
                                                    711/173
2004/0030668 A1* 2/2004 Pawlowski ........... G06F 3/0607
2006/0075123 A1* 4/2006 Burr ................. H04L 29/12311
                                                    709/228

* cited by examiner

STORAGE LIBRARY CLIENT INTERFACE SYSTEM AND METHOD

CROSS-REFERENCE TO RELATED APPLICATION

This application is a continuation of U.S. application Ser. No. 11/224,390 filed Sep. 12, 2005, which is hereby incorporated by reference in its entirety.

BACKGROUND OF THE INVENTION

1. Field of the Invention

The present invention relates generally to a method and system for interfacing with a storage library.

2. Background Art

Media management systems include storage libraries that are configured to physically store and retrieve media contained therein. In order for a customer to access the media stored and maintained by the storage libraries, the customer has a software application referred to as a client interface, which is compatible with the storage library software architecture. Thus, when a customer requests a particular media, the client interface is configured to communicate with the corresponding storage library, thereby causing the storage library to retrieve the requested media. However, conventional storage libraries are configured to communicate and execute requests from specific client interface types. For example, a storage library having a small computer system interface (SCSI) configuration may receive media requests only from a customer having a SCSI type client interface. Accordingly, a SCSI configured storage library is unable to execute customer requests from a non-SCSI type client interface. As such, a customer having multiple types of client interfaces is required to have media maintained by storage libraries that are compatible with each type of client interface. Such an arrangement is cumbersome and inefficient in that customers are required to use multiple storage libraries that are compatible with each client interface. Thus, the conventional media management systems do not efficiently utilize storage libraries to maximize their physical resources, thereby providing improved media management for customers.

The present invention was conceived in view of these and other disadvantages of conventional media management systems.

SUMMARY OF THE INVENTION

The present invention provides a system and method for managing media contained by a storage library. The data management system includes at least one storage library and a library controller configured to generate signals that control operations of the storage library. The system further includes at least one client interface operable with the library controller and being adapted to receive requests from multiple client types and communicate those requests to the library controller. Additionally, the library controller generates signals for the storage library and the storage library performs operations that correspond to the requests from the multiple client types.

The method includes configuring the library controller to generate signals that control operations of the storage library. The method includes receiving requests from multiple client types. The method further includes communicating the requests to the library controller through the use of a client interface. The method also includes generating signals for the storage library through the use of the library controller, wherein the storage library performs operations that correspond to the requests from the multiple client types.

The above embodiments and other embodiments, features, and advantages of the present invention are readily apparent from the following detailed description of the best mode for carrying out the invention when taken in conjunction with the accompanying drawings.

BRIEF DESCRIPTION OF THE DRAWINGS

The features of the present invention, which are believed to be novel, are set forth with particularity in the pendent claims. The present invention, both as to its organization and manner of operation, together with further objects and advantages thereof, may be best understood with reference to the following description, taken in connection with the accompanying drawings, in which:

DETAILED DESCRIPTION OF THE PREFERRED EMBODIMENT(S)

The removable media management system interfaces with one or more client computers and, in particular, with the operating system resident thereon, to direct all allocation activities for removable media whether this movable media is associated with manual handling processes, with automated library systems or with some cross installation archival systems. This system includes device allocation control software to create and maintain an inventory of removable media units, including tables which relate media units identified by the volume serial identification number with particular device characteristics. The removable media device allocation may be influenced by a set of rules that algorithmically guide allocation of media and devices on the basis of a plurality of variables. These variables can include media type, exterior physical dimensions of the media, data recording format used on the media, and data management characteristics of the data including user and application defined characteristics. In order to illustrate the operation of removable media management system, the invention is illustrated in the context of a virtual robot for a multimedia automated cartridge library system. This automated library system robotically stores and retrieves a large number of media elements for an associated plurality of client elements.

Figure 1:
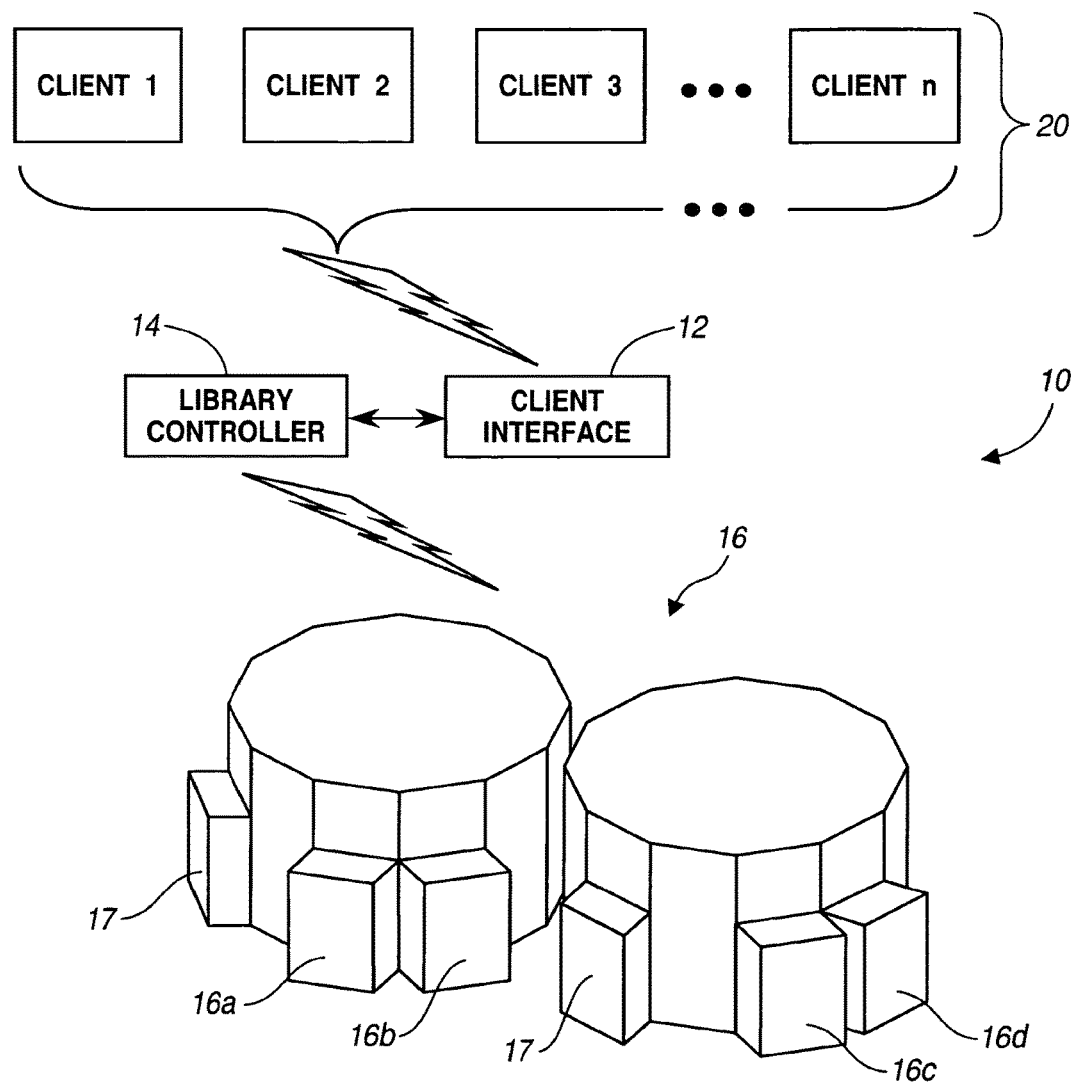
FIG. 1 illustrates a media management system in accordance with an embodiment of the present invention.

Referring to FIG. 1, a system diagram is shown illustrating a media management system 10 according to an embodiment of the present invention. Media management system 10 includes a client interface 12 that communicates with a library controller 14. Client interface 12 and library controller 14 are configured to receive external requests from clients 20. Clients 20 may be customers having media maintained by a storage library 16, as shown in FIG. 1. Accordingly, storage library 16 includes operator panels 17 and client elements 16a, 16b, 16c, and 16d. In the embodiment shown, storage library 16 includes two library storage modules that are adapted to store and retrieve removable media. Storage libraries of the type illustrated in FIG. 1 are available from Storage Technology Corporation, One StorageTek Drive, Louisville, Colo. 80028. It is also recognized that similar storage libraries as storage library 16 are described in further detail in U.S. Pat. No. 5,164,909 and U.S. Pat. No. 5,416,914, which are incorporated by reference in their entirety.

In operation, a user, as represented by clients 20, requests access to a data file maintained by storage library 16. This external request is translated into an identification of a particular media element which presently contains, or will store, the designated data file. For example, this data file may be stored in a designated magnetic tape cartridge, which magnetic tape cartridge is stored in, for example, storage library 16. A library control unit/operator panel 17 is configured to identify the exact physical location of the requested media element. Accordingly, storage library 16 contains robotics that enable the physical retrieval of the media element. As such, storage library 16 includes a robot arm (not shown) that receives instructions for retrieving the requested media elements. The robot arm in storage library 16 is controlled by library control unit/operator panel 17, which translates the control signals received, thereby causing the robot arm in storage library 16 to retrieve the requested media element from the media element storage cell in storage library 16. The media element retrieved by the robot arm in storage library 16 may then be placed by the robot arm in client element 16a, 16b, 16c, or 16d in accordance with the external requests from clients 20. In this fashion, an external data retrieval request from clients 20 is translated into the identification of a designated media element; this media element is automatically retrieved from its storage location and transported to a library module within storage library 16. That library module may then load the retrieved media element into the client elements 16a, 16b, 16c, or 16d where it can be accessed by the user through the use of clients 20.

Prior to storage library 16 executing the operations that correspond to the external requests from clients 20, the requests from clients 20 are first received by client interface 12 and library controller 14. It recognized that although client interface 12 and library controller 14 are illustrated as separately, client interface 12 and library controller 14 may be integrated as one unit or device. Additionally, the external requests from clients 20 may be of different types. Accordingly, having external requests with differing client interface types requires client interface 12 and library controller 14 to identify and translate the differing types of external requests to execute those requests via storage library 16. As such, each external request to storage library 16 is initially received by client interface 12 that is operable with library controller 14. The external requests from clients 20 will each have a client identifier which includes a client type and an instance number of that interface type. Client interface 12 is configured to interpret the external requests from clients 20 by determining the particular client type and communicate the external requests in a compatible form to library controller 14. As such, library controller 14 includes a library controller interface that is operable with storage library 16 for generating signals that control operations of storage library 16 in response to the requests of clients 20. Client interface 12 includes an adapter software that is compatible with each external request type from clients 20. In one embodiment, the interface types include a small computer system interface (SCSI) and/or a host library interface (HLI). A non-limiting example of a client identifier is "SCSI3," wherein the term "SCSI" is the client type and the number "3" is the instance number. Thus, through the use of the adapter software, client interface 12 is configured to determine that the client identifier "SCSI 3" represents the third SCSI client. Additionally, the adapter software may be written to include virtually any interface type without departing from the scope of the present invention.

With the client identified, the library controller can generate signals that enable execution of the external requests from clients 20. Client interface 12 is further configured to have a client mapping configuration for associating the client types with their corresponding client elements 16a, 16b, 16c, and 16d. Additionally, the client elements 16a-16d further include hardware, such as a library storage cell, a tape drive, and a cartridge access port. As such, library controller 14 is adapted to generate signals that enable storage library 16 to access the appropriate client elements that correspond to the external requests from clients 20. Additionally, storage library 16 includes operator panel 17, which is also configured to communicate with the library controller to access the client mapping configuration of storage library 16.

Figure 2:
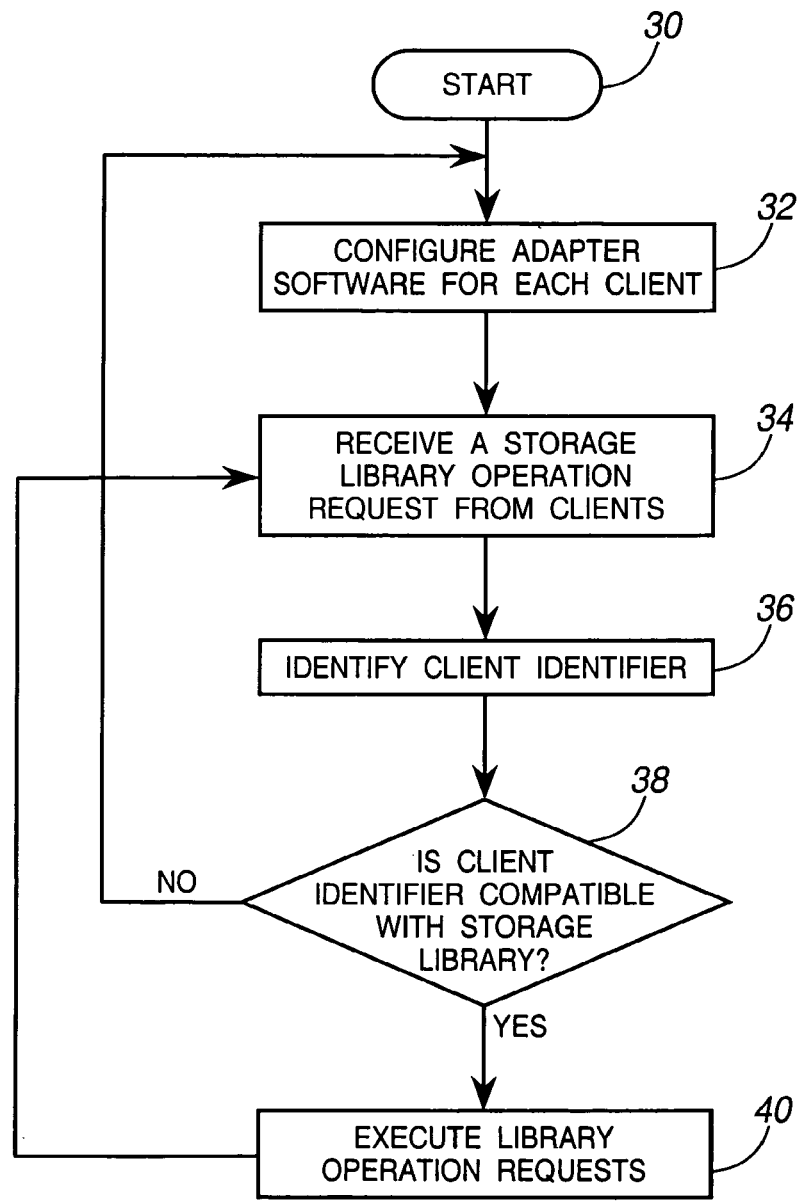
FIG. 2 illustrates a flow diagram of a method for executing storage library requests wherein the requests originate from multiple types of client interfaces.

Now referring to FIG. 2, a flow diagram illustrates a method for receiving, translating and executing external requests from clients 20 (FIG. 1). Accordingly, block 30 is an entry point to the method. As depicted by block 32, the media management system is configured with an adapter software for each client interface type. Block 34 illustrates receiving a storage library operation request from an external client. As depicted by block 36, the external request received through the use of client interface 12 (FIG. 1) will identify the client identifier. As described above, the client identifier includes a client type and a client instance number that is interpreted by the library controller for execution of the storage library operation request. Accordingly, as depicted by block 36, the client identifier is identified. As depicted by block 38, the method determines whether the client identifier is compatible with the storage library. If the identified client identifier is not compatible with the storage library, the method returns to block 32, wherein the adapter software may be configured to include that particular client type. Referring back to block 38, when the client identifier is determined to be compatible with the storage library, then the library operation requests are executed, as depicted by block 40.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for managing media contained by a storage library comprising:
configuring a library controller to generate signals that control operations of the storage library;
configuring a client interface to implement client adapter software to receive requests from a plurality of clients external to the storage library;
receiving a request, by the client interface via the client adapter software from a particular client of the plurality of clients, the request being associated with an interface type of the particular client;
determining, by the client interface, whether the interface type of the particular client is compatible with the library controller;
responsive to determining that the interface type of the particular client is compatible with the library controller:
transmitting the request by the client interface to the library controller; and executing, by the library controller, an operation in the storage library associated with the request; and responsive to determining that the interface type of the particular client is not compatible with the library controller: refraining, by the client interface, from transmitting the request to the library controller.

2. The method according to claim 1, wherein receiving requests from the particular client includes receiving a request having a client identifier.

3. The method according to claim 2, wherein the client identifier includes the interface type and a client instance number.

4. The method according to claim 1, wherein the storage library includes a plurality of client elements that include a library storage cell, a drive, or a cartridge access port.

5. The method according to claim 4, wherein the client elements are configured to provide access to at least one media element maintained by the storage library.

6. The method according to claim 5, wherein the at least one media element includes a memory disk or a memory tape.

7. The method according to claim 1 further comprising:
configuring an operator panel to communicate with the storage library and the library controller; and
communicating with the library controller through use of the operator panel to access a client mapping configuration.

8. The method according to claim 7, wherein the operator panel utilizes a client identifier to communicate with the library controller to access a client mapping configuration.

9. A media management system comprising:
a storage library;
a client interface (a) having client adapter software and (b) coupling a plurality of clients and a library controller, the client interface being configured to perform operations comprising:
  receiving a request, via the client adapter software from a particular client of the plurality of clients, the request being associated with an interface type of the particular client;
  determining, by the client interface, whether the interface type of the particular client is compatible with a library controller;
  responsive to determining that the interface type of the particular client is compatible with the library controller: transmitting the request by the client interface to the library controller;
a library controller configured to process requests received from the client interface by generating signals that control operations of the storage library.

10. The system according to claim 9, wherein the storage library includes a plurality of client elements that include a library storage cell, a drive, or a cartridge access port.

11. The system according to claim 10, wherein the client elements are configured to provide access to at least one media element maintained by the storage library.

12. The system according to claim 11, wherein the at least one media element includes a memory disk or a memory tape.

13. The system according to claim 9 further comprising an operator panel configured to communicate with the storage library and the library controller, wherein the operator panel utilizes a client identifier to communicate with the library controller to access a client mapping configuration.

* * * * *